May 20, 1969 — J. H. AUER, JR — 3,445,637
APPARATUS FOR MEASURING TRAFFIC DENSITY
Filed June 1, 1965 — Sheet 1 of 2

INVENTOR.
J.H. AUER JR.
BY Forest B. Hitchcock
HIS ATTORNEY

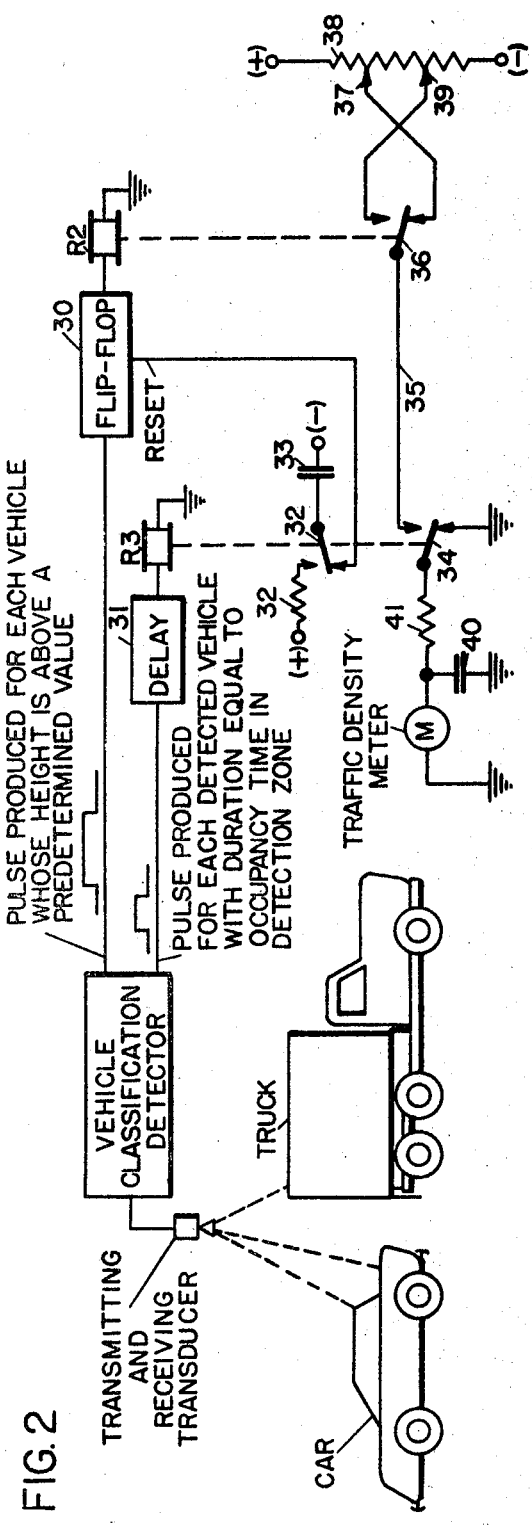
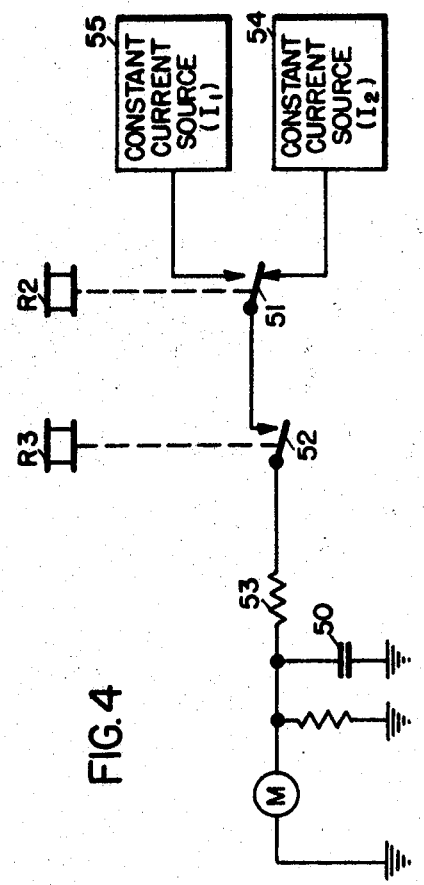

United States Patent Office 3,445,637
Patented May 20, 1969

3,445,637
APPARATUS FOR MEASURING TRAFFIC DENSITY
John H. Auer, Jr., Rochester, N.Y., assignor to General Signal Corporation, Rochester, N.Y., a corporation of New York
Filed June 1, 1965, Ser. No. 460,210
Int. Cl. G06m 11/00
U.S. Cl. 235—150.2                    10 Claims

ABSTRACT OF THE DISCLOSURE

Apparatus for measuring traffic density in which sonic detector means produce a discrete signal inversely proportional to only vehicle speed for each passing vehicle and a meter responsive to the discrete signals produces a measurement representative of traffic density.

---

This invention relates to apparatus for measuring a traffic parameter indicative of traffic congestion, and more particularly pertains to apparatus for measuring traffic density.

Numerous traffic control systems have been devised in which the traffic signals are controlled in response to the amount of traffic congestion. In some of these prior systems, the traffic control parameter used is vehicle volume which is a measure of the number of vehicles passing a given location per unit of time. The traffic volume parameter is not entirely satisfactory, however, because it may be ambiguous under certain conditions. For example, the traffic volume measured may be low under conditions of low traffic congestion but may also be low when the highway reaches high congestion conditions as well since the virtually clogged condition of the road may result in very little or no movement of the traffic.

In more recent years, the traffic parameter of density has been employed to control traffic signals. Density is now generally recognized as being a function of the number of vehicles per unit distance of highway. Density is generally considered superior to traffic volume since it is not ambiguous.

Many of the prior art systems for generating a signal which is a function of density have been quite complex and thus also quite expensive. One way in which density is measured is to measure both volume and vehicle speed and then to divide volume by speed to obtain the resultant parameter of density. Such a system is necessarily quite complex because it requires that counting, speed measuring, and dividing apparatus be included.

According to the present invention, I provide improved apparatus for determining the parameter of density which results in a system that is far less complex than heretofore considered necessary and accordingly less expensive and more readily maintained as well. In addition, the density measuring apparatus of this invention provides a more accurate measurement of the parameter of density than has been provided by the prior art apparatus.

Described briefly, the present invention comprises apparatus for measuring the traffic parameter of density. A sonic detector means responsive to each vehicle as it passes through a detection zone generates a discrete signal having a duration $t$ and an average amplitude $h$ such that the product $ht$ is substantially inversely proportional to only vehicle speed. A storage means stores a second signal having a value representative of density; means controlled by the vehicle responsive means generates the second signal by adding to the sonic detector generated signal for each vehicle detected an amount dependent on the product $ht$ and the magnitude of the then stored second signal, and subtracting from the stored signal at a rate proportional to the magnitude of the second signal.

In accordance with another aspect of the present invention it comprises a means for generating a quantity of signal for each detected vehicle in an amount inversely proportional to the speed of the vehicle together with a means for determining the ratio of the cumulative amount of such signals occurring throughout any given measuring interval to the total duration of such measuring interval. In a specific embodiment of the invention, the said generated signal is obtained from a Doppler speed detector which produces an alternating signal having a frequency dependent upon vehicle speed. An associated means demarcates a time interval for each vehicle detected with the duration of the time interval corresponding to the time required for a predetermined number of cycles of the Doppler beat frequency to occur. Such a demarcated time interval is necessarily inversely proportional in length to the speed of the detected vehicle. An averaging means continually determines the ratio of the cumulative amount of signal so generated in any interval to the total duration of that interval.

In an alternative embodiment, a vehicle sonic presence detector is used which is of the classification type in that it is separately responsive to high vehicles such as trucks and lower vehicles such as ordinary passenger cars. By differentiating among vehicles on the basis of their height, a quite accurate differentiation is also made among their lengths, based on the assumption that the higher vehicle has a greater average length than the lower vehicle. Such a presence detector produces an output signal whose duration substantially equals the time that any part of the vehicle is present in a detection zone defined by the detector. If the amplitude of the presence detector signal generated for each detected vehicle is made of lower amplitude for a long vehicle than for a short vehicle and with the amount of the reduction in amplitude substantially proportional to the difference in length, then the difference in length will be compensated for with the result that the amount of signal generated for each vehicle detected will then be a function only of its speed.

It is thus an object of the invention to provide apparatus for the measurement of traffic density wherein there is generated for each vehicle detected whose magnitude is inversely related to vehicle speed, together with means for time averaging the resulting signal to obtain traffic density.

It is another object of this invention to provide apparatus for measuring traffic density which makes use of a sonic Doppler speed measuring apparatus.

It is a further object of this invention to provide apparatus for measuring lane density which makes use of a sonic presence detector of the type which differentiates between vehicles according to their different heights and thus differentiates also implicitly on the basis of their different lengths.

It is still another object of this invention to provide apparatus for measuring lane density which includes means for generating, for each vehicle detected, a signal whose magnitude is inversely related to vehicle speed, means for storing a signal representative of density, means for adding the generated signal to the stored signal, and means for subtracting signal from the stored signal.

Other objects, purposes, and characteristic features of this invention will in part be obvious from the drawings and will in part become clear as the description of the invention progresses.

In describing the invention, reference will be made to the accompanying drawings in which:

FIG. 2 is a diagrammatic illustration of an alternative form of the invention which uses a classification detector of the presence detecting type;

FIG. 4 illustrates a modified form of the invention shown in FIG. 2, also showing the use of a plurality of constant current sources which are selectively connected to the averaging circuit.

Figures 1, 3, 5:
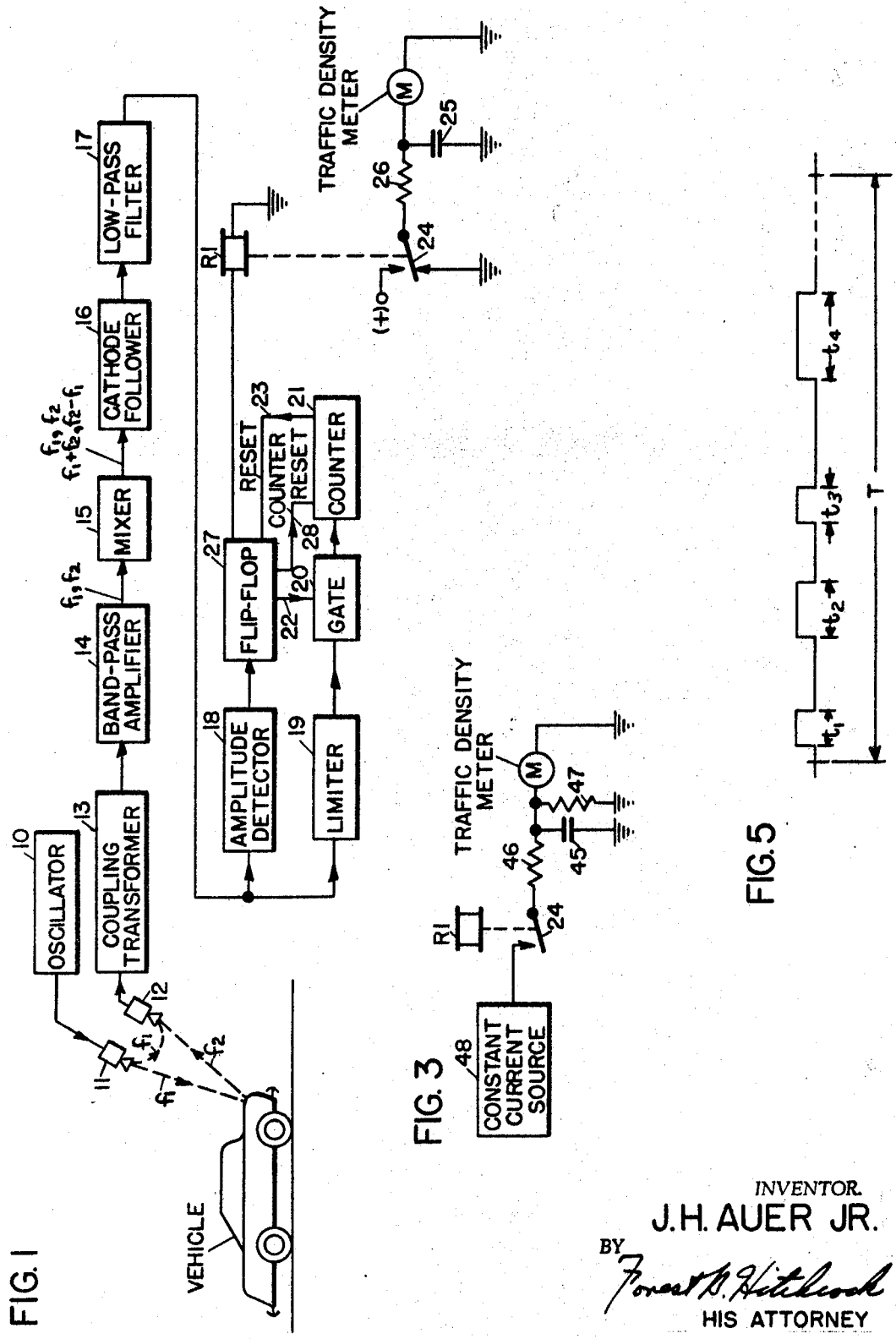
FIG. 1 is a diagrammatic illustration of one embodiment of the invention which uses a sonic Doppler speed measuring apparatus.
FIG. 3 illustrates a modification of the embodiment of the invention shown in FIG. 1 and particularly illustrates the use of a constant current source which is selectively connected to the averaging circuit.
FIG. 5 illustrates graphically the signal which is average to provide a measure of density.

FIG. 1 illustrates in block diagram form a sonic Doppler speed measuring apparatus similar to that which is disclosed and claimed in the prior copending application of J. H. Auer, Jr. and K. H. Frielinghaus Ser. No. 102,558, filed Apr. 12, 1961, now Patent No. 3,233,212. An oscillator 10 generates an ultrasonic frequency which may be in the order of 20 kilocycles, and the output of the oscillator is applied to an electroacoustic transducer 11 which converts the electrical energy of the oscillator to compressional wave energy so that a beam of sonic energy is transmitted toward each vehicle. The direction of the transmitted sonic energy is such that there is a substantial component parallel to the direction of vehicle travel. Reflections of the sonic energy are received by a similar electroacoustic transducer 12 from where they are applied through a coupling transformer 13 to a band-pass amplifier 14. Amplifier 14 passes both the frequencies $f_1$ and $f_2$ to the mixer 15. In the mixer 15, a heterodyning action takes place so that the cathode follower 16 receives an input which comprises the frequencies $f_1$, $f_2$, and the sum and difference frequencies $f_1+f_2$ and $f_2-f_1$. All of these signals are applied to the low-pass filter 17 which is tuned to pass only the lower band of frequencies $f_2-f_1$ to both the amplitude detector 18 and the limiter 19.

The input signal of both the amplitude detector 18 and limiter 19 comprises an alternating signal having a frequency equal to the Doppler beat frequency signal which is proportional to vehicle speed. The amplitude of this signal naturally varies, starting at a relatively low value as the vehicle first enters the sound beam, then rapidly approaching a maximum, and decreasing again as the vehicle moves out of the sound beam. The amplitude detector is responsive to the amplitude of the signal and produces an output pulse only when the amplitude reaches a predetermined level. Any of various well-known circuits may be employed for the detector 18, such as, for example, a conventional Schmitt trigger circuit. Upon receiving the output pulse provided by the amplitude detector 18, the flip-flop 27 is operated from its normal state to its abnormal state, and this results in the energization of the winding of relay R1, causing it to pick up.

The Doppler beat frequency signal is also applied to limiter 19 which acts to limit the amplitude of the signal to a predetermined value so that a Doppler beat frequency signal of substantially uniform amplitude is applied to gate 20. Gate 20 is normally closed so that the beat frequency signal from the limiter 19 cannot be applied through the gate to the counter 21. However, flip-flop 27, when operated to its abnormal condition, provides a signal over lead 22 which opens gate 20 so that the beat frequency signal of limiter 19 can be applied directly through gate 20 to the counter 21. The successive beat frequency cycles of the Doppler signal are counted by counter 21 which may comprise any of various well-known counting circuits and may, for example, include a capacitor charging circuit of the type wherein a uniform increment of charge is added to a capacitor for each beat frequency cycle. When the capacitor charge reaches a predetermined level, an output signal is produced on lead 23.

When the predetermined number of pulses has been counted by counter 21 and a signal produced on lead 23, this signal is used to reset flip-flop 27, thereby restoring it to its normal state and thereby also closing the gate 20 so that no further beat frequency pulses can be counted by counter 21. Restoration of the flip-flop 27 has the effect of causing relay R1 to be restored to its normal dropped-away condition, and also causes a reset pulse to be applied to counter 21 over lead 28, thereby restoring counter 21 to its initial or zero condition.

From the description given thus far, it is apparent that relay R1 is picked up for each vehicle detected for a length of time that is a function of the time taken for a predetermined number of Doppler beat frequency cycles to be generated. It is therefore also obvious that relay R1 is picked up for each vehicle for a time interval which is inversely related to its speed.

Whenever relay R1 picks up, its front contact 24 closes and completes a charging circuit for capacitor 25 through resistor 26. Whenever relay R1 drops away, capacitor 15 discharges through this same resistor 26 and through back contact 24 to ground. Generally, therefore, capacitor 25 receives an increment of charge for each vehicle detected, which increment is a function of vehicle speed in that it is inversely related to vehicle speed and is also inversely related to vehicle speed and is also inversely related to the then-stored signal which is representative of density since obviously the greater the amount of signal stored on capacitor 25, the less signal will be added whenever front contact 24 is closed. Similarly, throughout any interval that relay R1 is dropped away, the amount of charge that is lost by capacitor 25 is a function of the amount of charge then on the capacitor and also a function of the length of time that back contact 24 remains closed.

Any of various well-known types of utilization means may be connected in such manner as to respond to the amplitude of voltage across capacitor 25. In FIG. 1, a meter has been shown and this meter may be calibrated to read density in terms of number of vehicles per unit distance of highway.

It can be demonstrated that the average value of a signal comprising a series of pulses, one for each vehicle detected, and with each pulse having a value inversely related to vehicle speed, constitutes a measure of traffic density. Thus, such a series of pulses is shown in FIG. 5, each pulse having a duration $t_1$, $t_2$, $t_3$, $t_4$ . . . $t_n$, all occurring throughout the interval T. Considering the embodiment of FIG. 1 wherein the overall signal being averaged is bi-valued, having a value of 1 during detection intervals and a value of 0 between detection intervals, and with the duration $t$ of any one pulse being inversely proportional to vehicle speed, then $$A_{av} = \frac{\frac{k}{v_1}+\frac{k}{v_2}+\frac{k}{v_3}+ \cdots \frac{k}{v_n}}{T}$$

In the case where all vehicles have the same speed $v$, $$A_{av} = n \cdot \frac{k}{v}$$

However, $$T = \frac{D}{V}$$

where D is the distance traveled in time T at speed $v$. Hence, $$A = \frac{n \cdot \frac{k}{v}}{\frac{D}{V}} = \frac{kn}{D} = \text{Density}$$

It can also be intuitively ascertained that the apparatus of FIG. 1 will produce the traffic parameter of vehicle density. Thus, density, which is a measure of the number of vehicles per unit distance of highway, can be represented as the ratio of vehicle volume to vehicle speed. In view of this, density must necessarily increase proportionately with vehicle volume provided that speed remains constant and must vary inversely with speed provided that vehicle volume remains constant. In the process of averaging a series of energy pulses, each of which has a value inversely proportional to vehicle speed and with one such pulse being generated for each vehicle detected, it is obvious that the result must be directly proportional to volume if speed is constant and the reason for this is that any increase in volume must produce a corresponding increase in the number of such pulses which are to make up the average, and since each pulse has a predetermined value (all vehicles having the same speed), it necessarily follows that the average value of the succession of pulses must vary in direct proportion to vehicle volume. Similarly, assuming that volume remains constant but that speed varies, the magnitude of the average signal must vary in inverse relationship to speed since the area of each individual pulse varies in inverse relationship to the speed of the corresponding vehicle while the number of pulses must remain in the same because of the constancy of the vehicle volume. The average value of such a signal must necessarily be a function of density.

FIG. 2 illustrates an alternative embodiment of the invention employing a classification detector of the type illustrated in the Patent No. 3,042,303 issued to H. C. Kendall et al. on July 3, 1962. As described in detail in that patent, a classification detector includes a means for generating successive short pulses of ultrasonic energy which are transmitted from an electroacoustic transducer downwardly toward the tops of passing vehicles, means for receiving reflections of such pulses, and means for differently responding to the reflected pulses in accordance with their round-trip propagation time. Obviously, a high vehicle such as a truck or bus will provide a shorter round-trip propagation time of each pulse from the transducer, to the top of the reflecting vehicle, and thence back to the transducer than will an ordinary passenger car. The aforesaid Patent No. 3,042,303 discloses how this differentiation makes possible the classification of detected vehicles according to their height. As is also disclosed in the prior patent, such a detector is capable of producing an output pulse for each vehicle detected with the pulse duration being directly proportional to the length of time that the vehicle occupies the detection zone.

FIG. 2 shows that the pulse produced for each high vehicle, i.e. a "truck" pulse, is applied to a flip-flop circuit 30 and operates that flip-flop circuit from its normal state to the abnormal state, thereby actuating relay R2. The separate output lead of the classification detector that provides a pulse for each detected vehicle irrespective of vehicle height (the "all-vehicle" pulse) is applied to a delay circuit 31, and the output of the delay circuit is used to control a relay R3. The amount of delay that is to be provided by the delay circuit is only that which will ensure that at the time relay R3 is picked up by such delayed signal, relay R2 will already have been energized in the event that the detected vehicle was of a height indicative of a truck or bus. At the end of the "all-vehicle" pulse, relay R3 drops away and then closes its back contact 32. As a result, capacitor 33 which was charged through front contact 32 and resistor 32a when relay R3 was picked up is now discharged and a corresponding voltage pulse is applied to flip-flop 30 to restore it to its normal state with the result that relay R2 then drops away.

For each vehicle detected, therefore, relay R3 is picked up for a length of time dependent upon the occupancy time of the vehicle in the detection zone. If a succession of low vehicles, or passenger cars, passes through the detection zone, the amount of closure time of front contact 34 of relay R3 will of course not be dependent alone upon vehicle speed but will also depend upon vehicle length. However, for a relatively large sampling of passenger cars, the average length is readily ascertained so that the average closure time of contact 34 is quite closely proportional inversely to vehicle speed. Of course, to the extent that any such sample includes an appreciable number of trucks, buses, or other long vehicles, the assumed average length is no longer representative of actual average vehicle length of the sample so that the average closure time of front contact 34 is no longer inversely proportional to vehicle speed. This factor can be compensated for, however, by reducing the amplitude of the pulse generated for a vehicle when that vehicle has been detected as being a long vehicle. In other words, if for each vehicle detected which is a truck or bus, the corresponding pulse is reduced in amplitude from the amplitude employed for passenger cars and with the reduction in amplitude corresponding generally to the ratio of the assumed average long vehicle length compared to passenger car length, then the total value of the pulse generated for a vehicle will nevertheless be inversely related to its speed. Thus, it can be said with respect to this embodiment of the invention that the area of the pulse generated in response to a vehicle is inversely proportional to its speed rather than, as in FIG. 1, merely having pulse length inversely proportional to speed, with all pulses of uniform amplitude.

Referring again to FIG. 2, when any detected vehicle is of low height indicative of a passenger vehicle relay R2 will be dropped away throughout the closure time of front contact 34. Consequently, lead 35 will then be connected through back contact 36 of relay R2 to tap 37 on potentiometer 38. If the detected vehicle is of a height above the predetermined value indicative of a truck or bus, then relay R2 will be picked up and its front contact 36 closed. At such time, the voltage on wire 35 will instead be at a lower value as determined by the position of tap 39 on potentiometer 38. The amount by which the potentiometer voltage is reduced for a truck or bus as compared to the voltage provided for a passenger car is selected to be proportional to the ratio of the length of average trucks and buses, on the one hand, as compared to the average length of passenger cars on the other hand. Consequently, the factor of variable vehicle length, as between passenger cars and trucks and buses, is effectively taken into account so that the signal which is applied through the front contact 34 of relay R3 to the upper terminal of capacitor 40 is primarily only a function of vehicle speed and only in a minor way a function of vehicle length.

The circuit for charging capacitor 40 through from contact 34 and resistor 41 and discharging this capacitor through the same resistor 41 and through back contact 34 is identical to that described in connection with FIG. 1 so that no further detailed description thereof need be given.

It can be demonstrated also that the embodiment of FIG. 2 provides a manifestation of traffic density. Thus, assuming that the detector is capable of providing an infinite classification of vehicle lengths and corresponding variations in the amplitude of the signal pulse generated for each vehicle, then $h \times l = k$ where $h$ equals pulse height, $l$ equals vehicle length, and $k$ is a constant. Also, $t = l/v$ where $t$ equals pulse length and $v$ equals vehicle velocity. However, $A = h \cdot t$ where A is the area of any one pulse. Since $h = k/l$ and $t = l/v$, then $A = k/v$, thereby proving that the area of any one discrete pulse is inversely related to the speed of that vehicle. If $n$ vehicles are detected, generating $n$ discrete pulses, and D is the distance occupied by the $n$ vehicles, then density must necessarily equal $n/D$. If T is the total time over which the $n$ pulses occur, then the average amplitude of the $n$ pulses over time T can be expressed by:

$$A_{av} = \frac{\frac{k}{v_1} + \frac{k}{v_2} + \frac{k}{v_3} + \cdots \frac{k}{v_n}}{T}$$

In the case when all vehicles have the same velocity $v$, $$\frac{k}{v_1} = \frac{k}{v_2} = \frac{k}{v_3} = \frac{k}{v}$$

Therefore, $$A_{av} = \frac{n \cdot k}{T}$$

However, $T = D/v$ where $D$ is the distance traveled in time $T$ at velocity $v$. Thus:

$$A_{av} = \frac{\frac{n \cdot k}{v}}{\frac{D}{v}} = \frac{kn}{D} = \text{Density}$$

FIG. 3 discloses a modification of the apparatus shown in FIG. 1. In other words, in FIG. 3 all of the apparatus for the control of relay R1 is like that shown in FIG. 1, and the only difference in FIG. 3 resides in the different averaging circuit employed.

In FIG. 3, each closure of front contact 24 of relay R1 causes a charging circuit to be completed for capacitor 45 through resistor 46 and front contact 24 to a constant current source 48. Whenever relay R1 is dropped away and front contact 24 open, this charging circuit is interrupted. At all times, however, a shunt path is provided for capacitor 45 through parallel resistor 47. Thus, it may be considered that capacitor 45 is charged from constant current source 48 whenever relay R1 is picked up, but that capacitor 45 is also subject to a constant discharge through resistor 47. With respect to the charging of capacitor 45 from constant current source 48, the charging is at a constant rate and independent of the level of voltage accumulated on capacitor 45. On the other hand, the amount of discharge occurring at any instant through the parallel resistor 47 is directly proportional to the amplitude of voltage then appearing across capacitor 45.

It can also be demonstrated that the embodiment of FIG. 3 produces a quantity of charge in capacitor 45 which is a measure of density. Thus, the amount of charge which is added to capacitor 45 throughout any measuring interval T is a function of the cumulative area of the pulses produced in that measuring interval, one for each vehicle detected. Thus, since the charging rate is constant throughout the vehicle detection time and since the area of any one pulse is inversely related to the speed of that vehicle, then $Q_{in} = n \cdot l/v$ where $Q_{in}$ is the amount of charge added to capacitor 45, $n$ is the number of vehicles detected in time $T$ and $v$ is the velocity of the vehicles detected. On the other hand, $Q_{out} = I_{av} \cdot T$ where $Q_{out}$ is the amount of charge subtracted in the averaging interval T and $I_{av}$ is the average discharge current through resistor 47. The equipment tends to change its indication gradually as traffic conditions change to give a useful running average. However, when the amount of signal being added at any time is equal to the amount being subtracted, the indication remains constant. At such time, $Q_{in} = Q_{out}$. Therefore, $$I_{av} = \frac{n \cdot \frac{1}{v}}{T}$$

Since $$T = \frac{D}{v}$$

where $T$ is the time required to travel distance $D$ with velocity $v$, then $$I_{av} = \frac{\frac{n}{v}}{\frac{D}{v}} = \frac{n}{D} = \text{Density}$$

The magnitude of $I_{av}$ can, of course, be determined by measuring the voltage across the shunt resistor 47.

FIG. 4 illustrates a modification of the form of the invention shown in FIG. 2. Here again all of the apparatus for the control of relays R2 and R3 is like that shown in FIG. 2, and the only difference resides in the different averaging circuit by means of which the charge is accumulated in capacitor 50 in an amount representative of density. Thus, assuming that the vehicle detected is a passenger car so that relay R2 remains dropped away and its back contact 51 closed, then throughout the occupancy time of that vehicle in the detection zone, when relay R3 is picked up and its front contact 52 closed, a charging circuit for capacitor 50 is completed through resistor 53 to the constant current source 54. If, however, the detected vehicle is a truck or other high vehicle thereby indicating that the detected vehicle has an average length greater than that of a passenger car, the relay R2 is picked up. Consequently, through the vehicle detection interval when relay R3 is picked up, a charging circuit is completed for capacitor 50 through resistor 53, front contact 52 of relay R3 and front contact 51 of relay R2 to the constant current source 55. In a manner similar to that described in connection with FIG. 2, the constant current source 55 is controlled to provide a charging current of lower magnitude than that provided by constant current source 54 and the amount of the difference is chosen to be substantially proportional to the ratio of the average length of long vehicles detected, such as trucks and buses, to the average length of passenger cars detected.

From the description previously given in connection with FIG. 3, it can be understood that the apparatus of FIG. 4 similarly is effective to produce an amount of charges across capacitor 50 which is representative of traffic density. Thus, the explanation given with respect to FIG. 3 pointed out that traffic density was obtained provided that the area of any one charging pulse was inversely proportional to the speed of the vehicle, and, as mentioned in connection with the description for the embodiment of FIG. 2, it is apparent that the current pulses which are produced in this embodiment of FIG. 4 have respective areas which are proportional inversely to the speeds of the respective vehicles since, the factor of vehicle length is properly taken into account by providing a lower amplitude of charging current for longer vehicles.

Having described several embodiments of apparatus for measuring the parameter of traffic density, I wish it to be understood that various modifications and alterations may be made to the specific forms shown without in any manner departing from the scope of this invention.

What I claim is:

1. Apparatus for measuring the traffic parameter of density comprising in combination, sonic detector means responsive to each vehicle as it passes through a detection zone defined by said detector means for generating a discrete signal having a duration $t$ and an average amplitude $h$ such that the product $ht$ is substantially inversely proportional to only vehicle speed, storage means for storing a second signal having a value representative of density, and means controlled by said vehicle responsive means for generating said second signal by adding to said signal for each vehicle detected in an amount dependent on the product $ht$ and the magnitude of the then stored second signal, and subtracting signal from the stored signal at a rate proportional to the magnitude of said second signal.

2. The apparatus of claim 1 in which said vehicle responsive means generates said discrete signal for each vehicle detected which signal has a predetermined fixed amplitude and a duration $t$ which is inversely proportional to only vehicle speed; and signal is subtracted from said second signal only during the intervals between successive discrete signals.

3. The apparatus of claim 2 in which said vehicle responsive means comprises a speed measuring means producing a frequency signal which frequency is proportional to the speed of the detected vehicle, means for counting a predetermined number of cycles of said frequency signal and demarcating a time interval required to count said predetermined number of cycles, said vehicle responsive means generating said discrete signal with said duration $t$ substantially equal to said interval demarcated by said counting means.

4. The apparatus of claim 3 in which said storage means comprises a capacitor, said vehicle responsive means connects said capacitor to a constant current source during each interval $t$, and resistance means connected in shunt with said capacitor.

5. The apparatus of claim 3 in which said speed measuring means comprises a Doppler device and said frequency signal comprises a beat signal which frequency is proportional to the speed of the detected vehicle.

6. The apparatus of claim 3 in which said storage means comprises a capacitor, and said vehicle responsive means connects said capacitor to a voltage source of predetermined amplitude through a resistor of predetermined value during each interval $t$ and connects said capacitor to a discharging circuit having said same predetermined value of resistance at all other times.

7. The apparatus of claim 1 in which said vehicle responsive means includes a presence-type vehicle detector producing a presence signal for each vehicle detected having a duration that substantially equals the time that any part of said vehicle occupies said detection zone, said vehicle responsive means further including means producing a signal having a value indicative of the length of the detected vehicle, said vehicle responsive means being controlled by said presence detector means to generate said discrete signal with a duration $t$ substantially equalling said time interval demarcated by said presence detector means and an amplitude $h$ which is substantially inversely proportional to the value of said vehicle length signal.

8. The apparatus of claim 7 in which the means for producing a signal indicative of the detected vehicle length comprises sonic transmitter and receiver means, gating means for determining the transit time of transmitted sonic signals reflected from vehicles, and means controlled by the transit time for producing the vehicle length signal, said vehicle length signal magnitude varying relative to the height of the vehicle.

9. The apparatus of claim 8 in which said storage means comprises a capacitor, said vehicle responsive means connects said capacitor to a constant current source during each interval $t$, and means for controlling the amplitude of the current provided by said constant current source to be substantially inversely proportional to the value of said vehicle length signal.

10. The apparatus of claim 8 in which said storage means comprises a capacitor, said vehicle responsive means connecting said capacitor to a voltage source during each said interval $t$, and means for controlling the amplitude of said voltage to be substantially inversely proportional to the value of said vehicle length signal.

References Cited

UNITED STATES PATENTS

| | | | |
|---|---|---|---|
| 3,047,838 | 7/1962 | Hendricks | 235—150.24 X |
| 3,193,798 | 7/1965 | Palmer | 235—150.24 |
| 3,239,653 | 3/1965 | Barker | 235—150.24 |
| 3,239,805 | 3/1966 | Brockett | 235—150.24 X |

MALCOLM A. MORRISON, *Primary Examiner.*

J. F. RUGGIERO, *Assistant Examiner.*

U.S. Cl. X.R.

235—150.24